No. 632,986. Patented Sept. 12, 1899.
W. D. BROOKS.
CAN SOLDERING MACHINE.
(Application filed Aug. 9, 1898.)
(No Model.) 3 Sheets—Sheet 1.
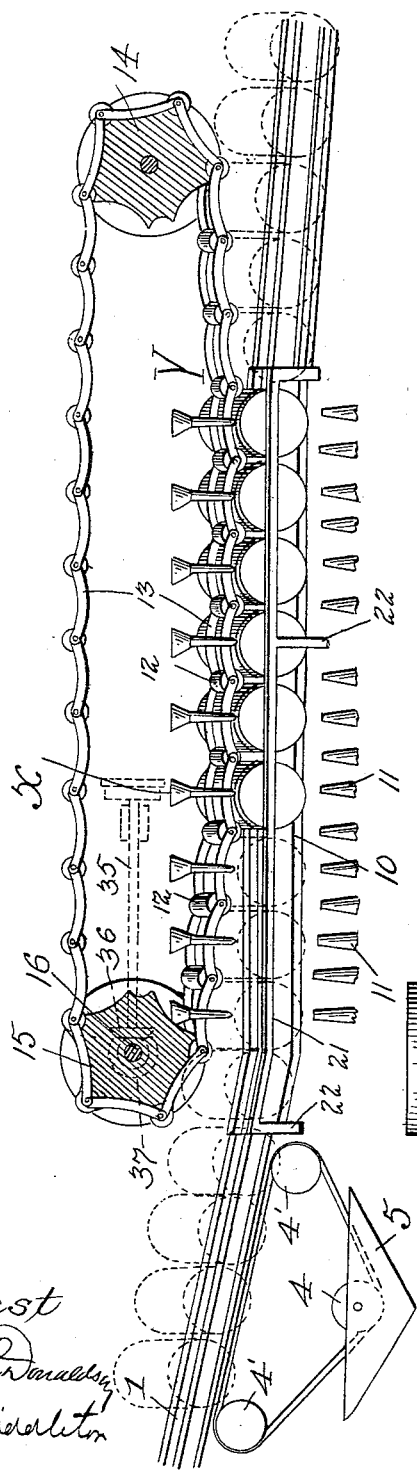
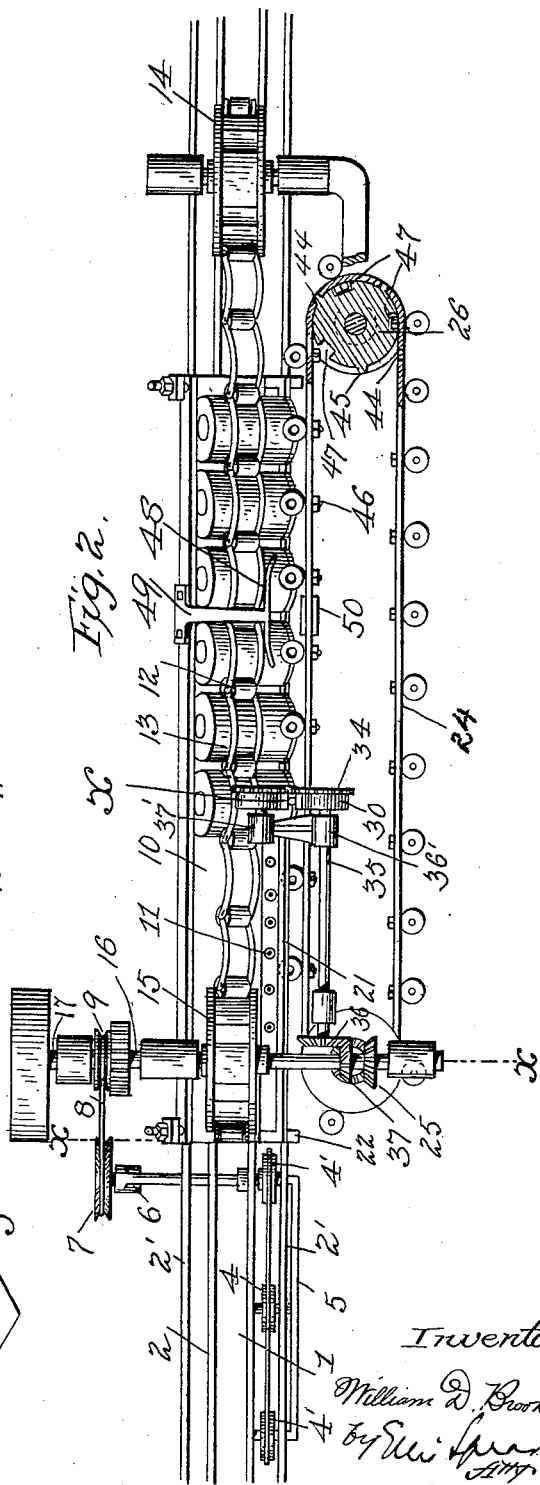

No. 632,986. Patented Sept. 12, 1899.
W. D. BROOKS.
CAN SOLDERING MACHINE.
(Application filed Aug. 9, 1898.)
(No Model.) 3 Sheets—Sheet 2.
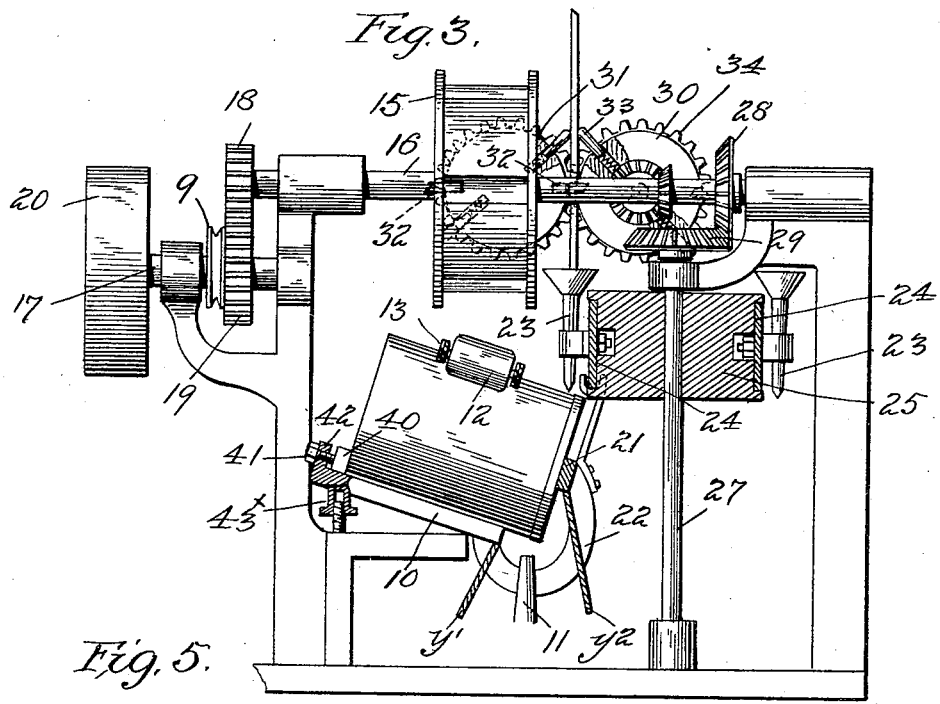
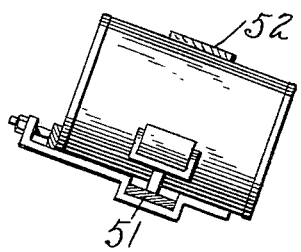
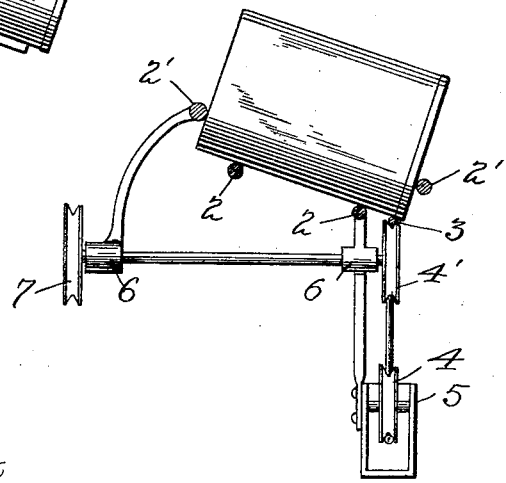
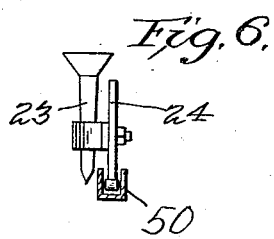
Attest
Walter Donaldson
F. L. Middleton
Inventor
William D. Brooks
by His Spear
Atty.
THE NORRIS PETERS CO., PHOTO-LITHO., WASHINGTON, D. C.

No. 632,986. Patented Sept. 12, 1899.
W. D. BROOKS.
CAN SOLDERING MACHINE.
(Application filed Aug. 9, 1898.)
(No Model.) 3 Sheets—Sheet 3.
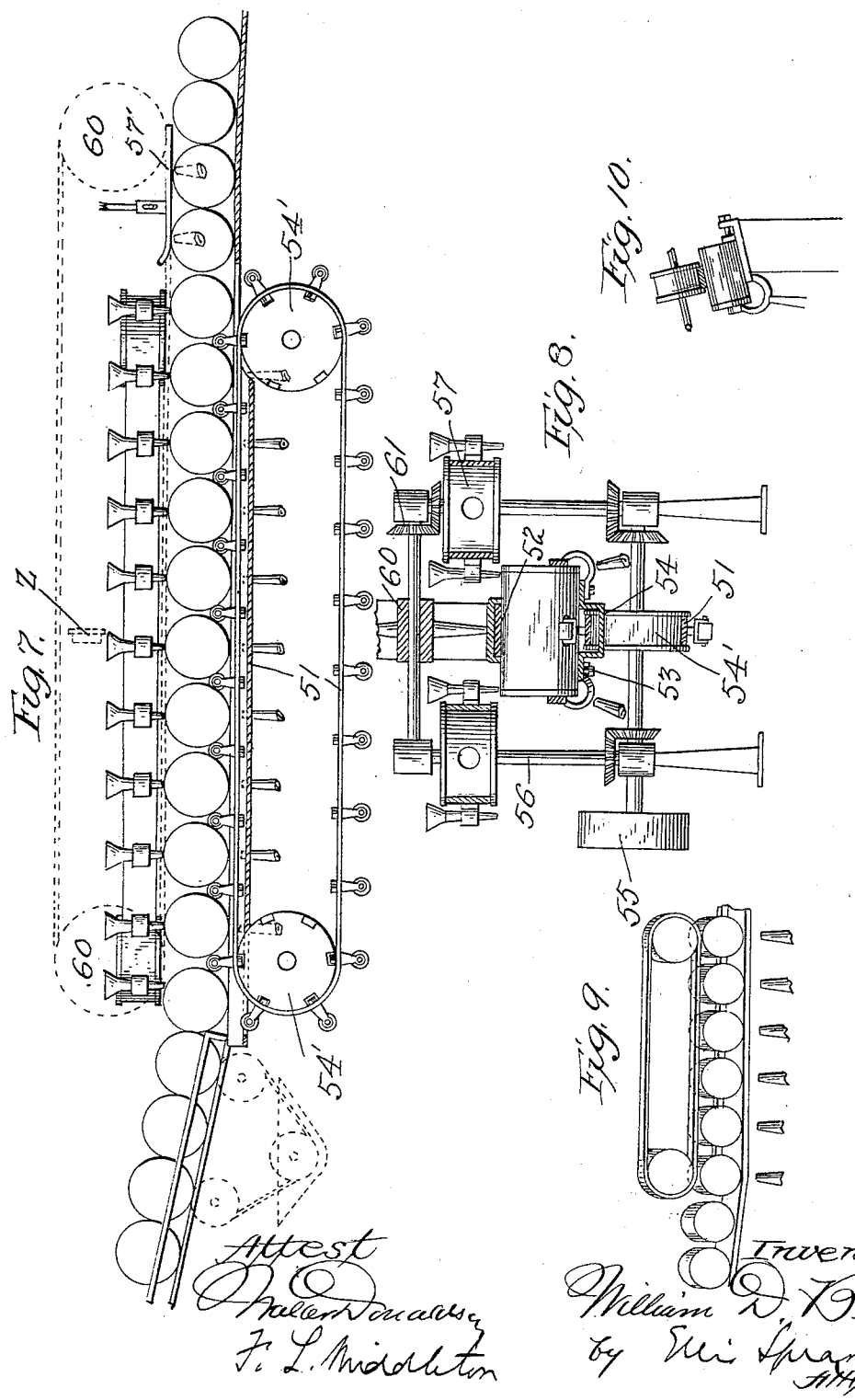

UNITED STATES PATENT OFFICE.

WILLIAM DYER BROOKS, OF BALTIMORE, MARYLAND.

CAN-SOLDERING MACHINE.

SPECIFICATION forming part of Letters Patent No. 632,986, dated September 12, 1899.

Application filed August 9, 1898. Serial No. 688,194. (No model.)

*To all whom it may concern:*

Be it known that I, WILLIAM DYER BROOKS, a citizen of the United States, residing at Baltimore, Maryland, have invented certain new and useful Improvements in Can-Soldering Machines, of which the following is a specification.

The object of the invention is to solder a great number of cans in a comparatively short space of time without the use of injurious fluids, such as muriate of zinc, rosin only or a composition thereof being used as a flux.

Heretofore in providing a machine of large capacity it has been customary to employ a solder-bath, through which the edge of the can was passed to be soldered. It is not practicable to use rosin as a flux in machines of this character, as the rosin will get into the bath and gum it up in a short time. In such machines therefore it is customary to use a fluid which will not injure the solder-bath in any way; but such fluids are injurious to health, being composed largely of muriate of zinc. In my machine I aim to secure all the advantages of speed and rapidity of production which are characteristic features of the bath type of machine; but I aim to eliminate those features which make such machines objectionable.

In the bath form of machine the can is soldered by simply passing it continuously through the machine. In my machine the same continuous action takes place; but instead of using a bath I employ a series of soldering devices, one for each can, said devices moving with the cans to act thereupon as they pass through the machine, the cans being rotated to bring all parts of the seam to the soldering devices.

My machine includes a trough or platform along which the cans are moved and rotated and a series of soldering devices which move with the cans to apply the solder thereto. It includes also the special construction of the trough and of the arrangement of the burners, and in various features of construction and arrangement hereinafter described, and pointed out in the claims.

In the drawings, Figure 1 is a front view of the machine with frame parts omitted and with the soldering-chain omitted also. Fig. 2 is a plan view of the machine with parts in section. Fig. 3 is a view taken on the line $xx$ of Fig. 2. Fig. 4 is a view of a detail. Figs. 5 and 6 are details. Fig. 7 is a view of a modification, and Fig. 8 is a transverse sectional view of Fig. 7. Figs. 9 and 10 are detail views showing a simple form of machine without soldering devices.

The cans to be soldered are introduced to the soldering mechanism by way of a grated trough 1 at the left of Fig. 1, which is composed of four rods 2 2', the rods 2' bearing on the heads of the can. The trough holds the cans on their side in inclined position, and in rolling down the trough, which is inclined longitudinally as well as laterally, they pass over a fluxing device, which consists of an endless band or wire 3, passing around the pulleys 4 4' and extending with its upper part parallel with one of the rods 2 directly in the path of the can. The lower one of the pulleys 4 is in a trough 5, containing flux. As the band moves it takes up this flux and applies it to the seam or joint between the head and body, as shown in Fig. 4. This part of the can projects beyond the bar 2 to expose the seam. The flux-applying band is caused to move by the rotation of the pulley 4', the shaft of which passes through bearings 6, Fig. 4, and has a pulley 7, which may be operated by a belt 8 from a pulley 9 on the shaft 17, Fig. 2. The can after having had the flux applied thereto rolls onto a platform or trough 10, which has no longitudinal inclination, but is inclined laterally, so as to hold the cans in inclined position, with their head ends projecting, as in Fig. 3, to be exposed to the flame from the burners 11, arranged along the platform, as in Fig. 1. The cans come into position as they move along between the rollers 12 of the chain 13, which passes over wheels 14 15 at the ends of the machine. The wheel 15 is on the main shaft 16, which receives motion through the gearing 18 19 from the shaft 17, Fig. 3, which is driven through the pulley 20. By this the chain is given a continuous movement, and its rollers bearing on the cans push them along the trough or platform. The cans in this movement are free to rotate, and they are held in proper position on the platform or trough by the rail 21, held by the brackets 22, extending from the platform, the said rail bearing against the end of the cans and leaving the edge of the head exposed for heating and soldering. As before stated, the burners are disposed along the platform to play against the edge of the can.

The soldering devices comprise tubes 23, having upper flaring mouths and carried in vertical position by a belt or chain 24, which passes around horizontal pulleys 25 26. The pulley 25 is on a vertical shaft 27, having bearings in the frame, Fig. 3, and it is driven through bevel-gearing 28 29 from the main shaft, so that the belt carrying the solder-tubes moves at the same rate of speed as the chain which moves the cans along the platform, and the tubes are so spaced apart that their lower ends are directly in line vertically with the center of the can, and said lower ends will discharge the solder directly against the seam or joint of the head with the body. The solder is applied to the tubes in short strips of determined lengths at the point X, at which is located a solder feed and cutting mechanism similar to that disclosed in Letters Patent of the United States granted to me September 11, 1888, No. 389,438, and which comprise, briefly, a pair of cutter-disks 30 31, one of which has cutters 32 and each of which has a spring-pressed feed-finger 33. The disks are geared together by the gears 34 and are driven by the shaft 35, which carries one of them, which shaft is driven from the main shaft by bevel-gears 36 37. The shaft 35 is supported in bearings 36', and one of these has an extending bracket 37' to support the other disk.

As the wide mouth of the solder-tube comes under this solder-feeding mechanism the spring-fingers thereof begin to feed the solder-wire down, and before the said mouth moves from under the solder-feed mechanism a sufficient length of wire will have been fed down and cut. This solder is supplied to the can only after it has been subjected to the heat from a number of burners. For instance, in Fig. 1 it will be seen that six burners act against the can before it arrives below the solder-feed mechanism, and it is therefore well heated, and thus the solder-wire as it drops from the tube is melted at once upon its contact with the seam. The tube and can now move along together, the can rotating meanwhile and bringing all parts into position to have the solder applied thereto. This soldering action continues until the can reaches the point Y at the end of the platform, at which point the discharge-chute is arranged, consisting, like the feed trough or chute, of a series of bars forming an open grating. This is inclined, and in rolling down this the cans free themselves from the chain. This trough is long enough so that the cans will be cooled in rolling down it. The trough or platform has also a guide-rail 40 at its rear edge for the cans, and this is adjustable, as shown in Fig. 3, by the screw or bolt 41, passing through the screw-threaded projection 42 on the trough and bearing on the guide-rail. The platform is also adjustable as to inclination by the nut $43^\times$, Fig. 3. The belt carrying the solder-tubes is provided with holes 44 to receive teeth or projections 45 on the pulleys. The tubes are secured to the belt by eyebolts and nuts 46, and the pulleys have recesses 47 to receive the nuts. The chain which moves the cans is held from sagging by a guard-plate 48, supported from the trough or platform by the bracket 49, and the tube-carrying belt may be similarly prevented from sagging by passing over and bearing upon a support 50.

As shown in Fig. 5, the chain for moving the cans along the trough may be in the form of a belt 51, having upwardly-extending forks or supports, with rollers journaled therein to bear on the cans. These rollers space the cans the desired distance apart, and the cans may be rotated positively by a belt 52, bearing on the upper side of the cans. This belt is shown more clearly in Figs. 7 and 8, which represent a modification of the machine designed to solder both heads at once. In this form the trough is of substantially the same form as that first described, it having the bottom portion and the side rails, providing a slotted form of trough, through the slots of which the burners may play upon the ends of the can. The side or rails are also adjustable in this form, as shown at 53. This trough is horizontal—that is, it is not inclined laterally—and it has a central depression 54, along which the belt 51 is moved in horizontal position, as is also shown in Fig. 5. This belt passes around rollers 54' below the trough, and it carries the projections and spacing-rollers heretofore described. The shaft of one of the rollers 54' may be driven by any suitable means, as the belt-wheel 55, and it is geared to shafts 56, one on each side, which have the horizontal pulley 57 thereon, around which pass the belts of the solder-feed tubes. There is one of these belts on each side of the machine, which presents the solder-feed tubes simultaneously to the opposite heads of the cans. The action of the machine is substantially the same as that described, excepting that both heads of the can are soldered simultaneously. The same arrangement of the fluxing device is used in this modification, and the solder-feed mechanism is substantially the same as that described, it being located at the point z, as shown in dotted lines, Fig. 7. After leaving the solder-tubes the cans pass below a soldering-iron 57'. In passing by this soldering-iron the cans are rotated by the belt 52, and this is shown more particularly in Figs. 7 and 8, said belt passing around pulleys 60, one of which is driven by bevel-gearing 61.

The flux consists of rosin dissolved in alcohol or its equivalent.

The heat at the burners may be retained by aprons $y'$ $y^2$, depending from parts of the trough.

I do not wish to limit myself to the combination of the slotted form of trough with the special soldering means described, as the features of the trough, the spacing-chain, the rotating belt, and burners are capable of use without special solder-applying devices. The solder may be placed in the can in short strips to effect the soldering without the use of solder-tubes or other devices, and an arrangement of this character is shown in Figs. 9 and 10.

I claim—

1. In combination in a can-soldering machine, a trough along which the cans pass and upon which they rest directly and a series of soldering devices moving with the cans and acting thereupon as they rotate along and in contact with the said trough.

2. In combination, in a soldering-machine, a trough or platform inclined laterally upon which the cans rest directly and along which the cans travel and rotate and a series of soldering devices moving with the cans and acting thereupon as they rotate in inclined position, substantially as described.

3. In combination, a trough or platform inclined laterally to hold the cans in inclined position and in direct contact therewith and with one end exposed, a series of burner-tubes acting upon the exposed part of the cans, and a series of solder-applying devices movable with the cans as they rotate along the trough and supplying the solder to the same seam that is heated by the burner substantially as described.

4. In combination, a trough or platform inclined laterally and of such width as to permit the cans to overhang, guide-rails for guiding the cans along the trough, a series of burners acting upon the exposed part of the cans and a series of solder-applying tubes with carrying means therefor to cause them to keep pace with the movements of the cans along the trough, substantially as described.

5. In combination, a can-soldering machine, means for supporting and moving the cans, a series of burner-tubes and a series of solder-applying tubes acting simultaneously upon the cans, and carrier means for said solder-applying tubes whereby they are moved to keep pace with the cans, substantially as described.

6. In combination, a trough or platform upon which the cans rest directly and along which the cans move, a chain or belt for engaging the cans to roll them along solder-applying devices and carrier means for moving the same to keep pace with the cans, substantially as described.

7. In combination, a trough or platform along which the cans move, a series of solder-applying tubes, a carrier for said tubes to move the tubes so as to keep pace with the cans and a solder feeding and cutting mechanism arranged at one point in the travel of the tubes to supply each tube in succession with a strip of solder, substantially as described.

8. In combination, in a can-soldering machine, a trough, a chain for moving the cans along the trough, solder-applying devices and a guide for the chain to prevent the same from sagging.

9. In combination, a trough upon which the cans rest directly, a chain for moving the cans along and in contact with the same, a series of solder-applying devices, carrier means therefor to make them keep pace with the cans, a series of burner-tubes, a flux-applying device at one end of the trough and the feed-trough in the form of a grating, substantially as described.

10. In combination in a can-soldering machine, a trough or platform having a slot through which the can edge will be left exposed, burners to act on the exposed parts of the can and soldering means for the cans moving therewith, said cans resting upon and rotating in direct contact with the trough substantially as described.

11. In combination, a trough upon which the cans roll directly, a chain or belt having means entering between the sides of the cans to space them apart, and solder-applying devices with movable carrier means therefor to move the same to keep pace with the cans, substantially as described.

12. In combination, a trough or platform, a belt over the cans for rotating them and solder-applying tubes with carrier means therefor, substantially as described.

13. In combination, a trough or platform, a chain or belt having upwardly-extending projections to space the cans apart and for moving the cans along the trough and solder-applying devices moving with the cans and spaced apart to correspond therewith, substantially as described.

14. In combination, the trough, the belt having upwardly-extending projections to extend between the cans, the belt over the cans bearing thereon to roll them along the trough, and the soldering devices with carrier means therefor to move them to correspond with the movement of the cans and spaced apart to correspond to the cans, substantially as described.

15. In combination, the trough, the belt having upwardly-extending projections to extend between the cans, the belt over the cans bearing thereon to roll them along the trough, and soldering means operating on the cans as held by the spacing means, substantially as described.

16. In combination, a slotted or open trough to support the cans with one end exposed, a flux-applying device in the path of the can, solder-tubes, a movable carrier therefor, and the burners directed against the exposed part of the can, substantially as described.

17. In combination, a trough or platform for the cans along which they move in direct contact therewith and rotate, soldering devices and a soldering-iron in the path of the cans, substantially as described.

18. In combination, a trough or platform along which the cans move, a series of burners for heating the exposed part of the can and a series of solder-tubes moving with the cans, the said burners acting to heat the cans for the application of the solder by the solder-feed tubes and thus coacting with said tubes to effect the soldering substantially as described.

19. In combination in a can-soldering machine, a trough or platform for supporting the cans upon their sides so that they may roll thereon with an edge exposed, heating means directed to the exposed parts of the cans, means for rolling the cans along the trough, said trough being non-circular in form, feeding and fluxing means at one end of the trough over which the cans roll upon their sides and the delivery at the opposite end of the trough, substantially as described.

In testimony whereof I affix my signature in presence of two witnesses.

WILLIAM DYER BROOKS.

Witnesses:
HENRY E. COOPER,
WALTER DONALDSON.